(12) United States Patent
Van Berkel

(10) Patent No.: US 8,135,897 B2
(45) Date of Patent: Mar. 13, 2012

(54) MEMORY ARCHITECTURE

(75) Inventor: Cornelis H. Van Berkel, Heeze (NL)

(73) Assignee: ST-Ericsson SA, Geneva (CH)

( * ) Notice: Subject to any disclaimer, the term of this patent is extended or adjusted under 35 U.S.C. 154(b) by 485 days.

(21) Appl. No.: 12/227,344

(22) PCT Filed: May 14, 2007

(86) PCT No.: PCT/IB2007/051822
§ 371 (c)(1),
(2), (4) Date: Jun. 29, 2009

(87) PCT Pub. No.: WO2007/135615
PCT Pub. Date: Nov. 29, 2007

(65) Prior Publication Data
US 2009/0300310 A1    Dec. 3, 2009

(30) Foreign Application Priority Data

May 16, 2006 (EP) .................................. 06113975

(51) Int. Cl.
*G06F 12/06* (2006.01)
(52) U.S. Cl. ............................. 711/5; 711/170; 711/202
(58) Field of Classification Search .................. None
See application file for complete search history.

(56) References Cited

U.S. PATENT DOCUMENTS

| 6,604,166 | B1 * | 8/2003 | Jana et al. ........................ 711/5 |
| 6,704,834 | B1 * | 3/2004 | Demeure et al. ................. 711/5 |
| 2004/0103262 | A1 * | 5/2004 | Glossner et al. ................. 712/4 |
| 2010/0042779 | A1 * | 2/2010 | Espasa et al. .................. 711/105 |
| 2010/0312945 | A1 * | 12/2010 | Hutson ............................ 711/5 |

FOREIGN PATENT DOCUMENTS

| GB | 2 365 588 A | 2/2002 |
| JP | 08 016478 A | 1/1996 |

OTHER PUBLICATIONS

Bedros Flanounik, et al., "Linear-time matrix transpose algorithms using vector register file with diagonal registers", IEEE, Parallel and Distributed Processing Symposium, Apr. 23-27, 2001, p. 330-337.
International Search Report dated Oct. 12, 2007 in connection with PCT Patent Application No. PCT/IB2007/051822.

* cited by examiner

*Primary Examiner* — Than Nguyen

(57) ABSTRACT

A memory architecture is presented. The memory architecture comprises a first memory and a second memory. The first memory has at least a bank with a first width addressable by a single address. The second memory has a plurality of banks of a second width, said banks being addressable by components of an address vector. The second width is at most half of the first width. The first memory and the second memory are coupled selectively and said first memory and second memory are addressable by an address space. The invention further provides a method for transposing a matrix using the memory architecture comprising following steps. In the first step the matrix elements are moved from the first memory to the second memory. In the second step a set of elements arranged along a warped diagonal of the matrix is loaded into a register. In the fourth step the set of elements stored in the register are rotated until the element originating from the first row of the matrix is in a first location of the register. In the fifth step the rotated set of elements are stored in the second memory to obtain a transposed warped diagonal. The second to fifth steps are repeated with the subsequent warp diagonals until matrix transposition is complete.

15 Claims, 8 Drawing Sheets

| S. No. | Operation | | | Addressing Mode | | R/W Control | | Multiplexor Control | | | |
|---|---|---|---|---|---|---|---|---|---|---|---|
| | Instruction | Source (From) | Destination (To) | Single Address | Vector Address | The R/W1 Control | The R/W2 Control | Multiplexor 354 | Multiplexor 353 | Multiplexor 351 | Multiplexor 352 |
| 1 | Read | The First Memory 310 | The Output of The Memory Arcchitecture 300 | ✓ | | R | | S | | | |
| 2 | Read | The Second Memory 320 | The Output of The Memory Arcchitecture 300 | ✓ | | | R | S | W | | |
| 3 | Gather Read | The Second Memory 320 | The Output of The Memory Arcchitecture 300 | | ✓ | | R | V | B | | |
| 4 | Write | The Input of The Memory Arcchitecture 300 | The First Memory 310 | ✓ | | W | | S | B | | |
| 5 | Write | The Input of The Memory Arcchitecture 300 | The Second Memory 320 | ✓ | | | W | S | | | |
| 6 | Scatter Write | The Input of The Memory Arcchitecture 300 | The Second Memory 320 | | ✓ | | W | V | | | |
| 7 | Move | The First Memory 310 | The Second Memory 320 | ✓ | | R | W | S2 | | | W |
| 8 | Scatter Move | The First Memory 310 | The Second Memory 320 | | ✓ | R | W | V | | | W |
| 9 | Move | The Second Memory 320 | The First Memory 310 | ✓ | | W | R | S2 | | B | |
| 10 | Gather Move | The Second Memory 320 | The First Memory 311 | | ✓ | W | R | V | | B | |

MEMORY ARCHITECTURE

CROSS-REFERENCE TO RELATED APPLICATION(S)

The present application claims priority under 35 U.S.C. 365 to International Patent Application No. PCT/IB2007/051822 filed May 14, 2007, entitled "MEMORY ARCHITECTURE". International Patent Application No. PCT/IB2007/051822 claims priority under 35 U.S.C. §365 and/or 35 U.S.C. §119(a) to European Patent Application No. 06113975.4 filed May 16, 2006 and which are incorporated herein by reference into the present disclosure as if fully set forth herein.

The invention relates to a memory architecture in particular to a memory architecture capable of supporting scatter/gather operations.

A microprocessor system comprises memories. Speed of the system is determined by a number of instructions executed by the microprocessor per second. The microprocessor executes the instructions according to the data made available to it from the memory. Due to a disparity between the operating speed of the microprocessor and the operating speed of the memory, the microprocessor often encounters stalls, consequently slowing down the operating speed of the system. Researchers have made ample attempts for improving the operating speed of the memories and thereby eliminating or reducing the disparity.

A popular solution for improving the speed of a memory is to enable it for parallel operations. A memory that allows parallel operations is referred as a parallel-memory. A parallel memory allows for reading from or writing to several memory slots in a single access cycle. A Single Instruction Multiple Data (SIMD) device is a conventional device that uses parallel memory, which can be accessed through elementary processors present within the SIMD device. SIMD devices have become increasingly popular for a wide range of algorithms and applications, in particular for processing data organized in tables, even more particularly in the domain of signal processing for wireless and multi-media. However, a basic SIMD device shows a poor performance for algorithms as matrix transposition, (de-) interleaving, table look-up etc. Further it is difficult/complex to implement these algorithms in a basic SIMD device. This is because the basic SIMD devices of a width P can only store/load P words to/from data memory in adjacent locations.

Advanced SIMD devices support so-called scatter-gather operations (i.e. scatter-store and gather-load). The scatter/gather operations allow storing/loading in/from P locations in/from P different memory banks. In these so-called scatter/gather (store/load) operations, a vector of P addresses is provided to the data memory, the vector being such that it contains one memory address per bank so that the memory banks can be addressed mutually independently. Commonly in signal processing applications like telecom or multi-media applications, a small word size (8 to 16-bit) is used. For such a small word size the overhead of plurality memory banks (i.e. P memory blocks) in a memory is substantially high in terms of silicon area and power consumption as compared to non-parallel memories as used in basic SIMD devices. Table 1 shows a comparison of the silicon area (in square millimetres) and the energy consumption (in pJ) of memories. The memories have the same capacity but a different architecture. The first one has 16 banks, each of 16-bit word size and the second has 2 banks each of 128-bit word size. Table 1 shows that a memory of 2 banks each having a width of 128 bits is about 30% cheaper than a memory of 16 banks, each having a width of 16-bits in 90 nmCMOS. A memory with thirty-two banks each of 8-bits will be even more expensive.

TABLE 1

| 4 K Vectors | Area [mm$^2$] | | Energy/Access [pJ] | |
|---|---|---|---|---|
| | Bank | Entire Memory | Bank | Entire Memory |
| 16 * 16 bit | 0.14 | 2.24 | 12 | 192 |
| 2 * 128 bit | 0.79 | 1.58 | 88 | 176 |

Bedros Hanounik and Xiaobo (Sharon) Hu, in their research paper [1] teach a matrix transposition, and introduce read and write actions along (shifted) diagonals using a specifically modified SIMD register file as part of an SIMD device. The idea is based on the assumption that the register file has at least a capacity of P vectors of P-words each, as larger matrices can always be partitioned into smaller sub-matrices. This solution can be generalized to register-file scatter/gather operations by allowing a vector of P indices in the register file, rather than addressing the (shifted) diagonals.

The implementation of this idea is expensive and slow. For example, transposition of an incoming data block requires at least 4 clock cycles per vector of P words namely: linear load of a vector from the data memory into the register file; diagonal read of a vector from the register file;
(vector rotate); diagonal write of the vector into the register file, and; store of the vector from the register file into the data memory. A Very Long Instruction Word (VLIW) architecture would allow execution of the vector-rotate operation in parallel with one of the other operations by pipelining. The (VLIW) parallelism that is normally implemented with SIMD devices is however very complicated and barely possible with the idea discussed in [1]. This is because the idea of Bedros et. al. [1]: makes the implementation of register bypassing/forwarding very complex; excludes use of read/write ports in parallel with a diagonal write; requires to increase the register file size, in the Instruction Set Architecture (ISA) with up-scaling of vector size; and last but not least, requires repeated loading of Look-Up Tables (LUT), in the LUT implementation.

The complexities of implementation of register bypassing/forwarding and the requirement of repeatedly loading LUTs can be addressed by introducing a dedicated functional unit into the VLIW architecture. However, this requires additional time (additional two clock cycles) for transporting vectors to and from the functional unit. Further for applications like matrix transposition, a rotation operation is required. This implies that there is a need of either an additional transportation path (note that the transportation path adds a time overhead of an additional two clock cycles) to existing rotation/shuffle functional unit or duplication of the rotation hardware. Furthermore for a generic functional unit, extra instruction bits as well as other additional hardware resources may be required.

Another prior art—disclosed in Japanese Patent JP 06,153,386—discusses a vector data processor. The vector data processor according to this art has a vector arithmetic unit, scalar operation equipment and an IO device.

Above discussion indicates that basic SIMD devices are cheap but are not flexible enough for implementing various algorithms. On the other hand advanced SIMD devices are more flexible as compared to basic SIMD devices, but they are extremely expensive in terms of silicon area, power and production cost.

Therefore, it is desirable to have a memory architecture that supports parallel operations and incorporates advantages of both basic and advanced SIMD devices.

To this end, a memory architecture is provided that comprises: a first memory having at least one bank with a first width, addressable by a single address, and; a second memory having a plurality of banks of a second width, said banks being addressable by components of an address vector and said second width being at most half of the first width, said first and second memories being coupled selectively. The invention further provides a method for transposing a matrix using said memory architecture comprising the steps of: moving the matrix elements from the first memory to the second memory; loading a set of elements arranged along a warped diagonal of the matrix into a register; rotating the set of elements stored in the register until the element originating from the first row of the matrix is in a first location of the register; storing the rotated set of elements into the second memory to obtain a transposed warped diagonal, and; repeating the steps of loading, rotating and storing for subsequent warped diagonals until matrix transposition is complete. In a matrix M (i, j) a warped diagonal M (k) is a set of elements M (i, (i+k) mod P) where P is the number of rows in the matrix. In the step of storing, overwriting of the elements of the received matrix is not allowed when a single register is being used; as this will cause a data loss. The method may be executed using a first and a second register. The second register may be used for loading a mutually opposite warped diagonal. This would avoid any data loss due to overwriting while storing an obtained transposed warped diagonal. This ensures an efficient use of available resources.

Above aspect of the invention achieves inclusion of an advanced vector memory and a basic memory for an SIMD device and inclusion of a communication facility for communicating amongst them. The advanced vector memory is implemented in a small portion as compared to the basic memory, thereby reducing the silicon area overhead, the power consumption and the production cost and also including functionalities/flexibilities/advantages of advanced vector memories. The communication facility ensures that the data present in basic memory portion is also available to the advanced vector memory when desired by the advanced vector memory and vice versa. This allows the memory architecture to support scatter/gather operation despite of the fact that not the entire memory is implemented as an advanced vector memory.

The second memory is addressable by an address vector; said second memory is implementable in one or more latches for example one latch per bit. The second memory may also be implemented in registers or SRAMs wherein SRAM stands for Static Random Access Memory. Further the first and second memory can operate independently. This means that a single address may be provided to the first memory and an address vector may be provided to the second memory and both the memories may be accessed in a single clock cycle. The first and the second memory may be provided with a shared read and write facility. Reading and writing of lines are supported by both the first memory and the second memory. The second memory supports the scatter/gather operations.

In an embodiment the size of the addressable range of locations in the second memory is smaller than the size of the addressable range of locations in the first memory. Further the second memory is a memory addressable by an address vector, said address vector has components, and each component addresses one memory location per bank. Since the addressable range of locations in the second memory is smaller than the addressable range of locations in the first memory, the size of the components of the address vector can be kept smaller. This is in particular advantageous, as the address vector for the second memory is composed of a relatively large number of components. Consequently a modest reduction of size of the components results in a significant reduction in the size of the address vector which ensures more efficient use of on-chip/board resources. Furthermore, a small address vector allows a small ratio between the size of the address vector and the size of the data that is to be accessed. The addresses by which the first and the second memories are addressed may or may not have an overlapping address range. In case if the addresses are overlapping across the memories then those locations of the first memory that are addressed by the overlapping addresses are not used.

The first memory and the second memory are coupled selectively for enabling a communication between the two memories. This feature enables a move-operation amongst the first memory and the second memory. The move-operation refers to moving data from one memory to the other memory within the memory architecture. The move-operation may be executed without disturbing the external access of the memory. This feature of the architecture enables the architecture to a handle data table having size larger than the largest size of the data table that can be handled by a second memory as single a data table. Such data tables can be divided in a plurality of second tables, Each of the second table of the plurality can be handled by the second memory individually. The data table is store in first memory and one or more of the second tables are moved to the second memory. Pipelining of instruction can ensure that there time there is no or minimal time overhead due to the move-operation from one memory to other memory. The first memory and the second memory are selectively coupled using multiplexors or tri-state transistors. Further, where the use of multiplexors has been described it should be understood that these multiplexors could be implemented with any circuit that has a multiplex function. This includes a logic circuit with an input output relation that copies data from one data input or another dependent on the value of a control signal on a control data input, a circuit with control signal controlled switches between the output and respective inputs, or tri-state drivers with outputs coupled to a multiplexor output and inputs coupled to the respective inputs, the control signal determining which of the drivers will not be in a high impedance output state.

The invention as well as the embodiments thereof will now be elucidated in more detail with reference to the drawings, therein:

FIG. 3a shows a table explaining different modes of operation possible with the memory architecture 300.

FIG. 6 illustrates a matrix transposition, and;

FIGS. 7a-7d illustrate another matrix transposition.

Figure 1:
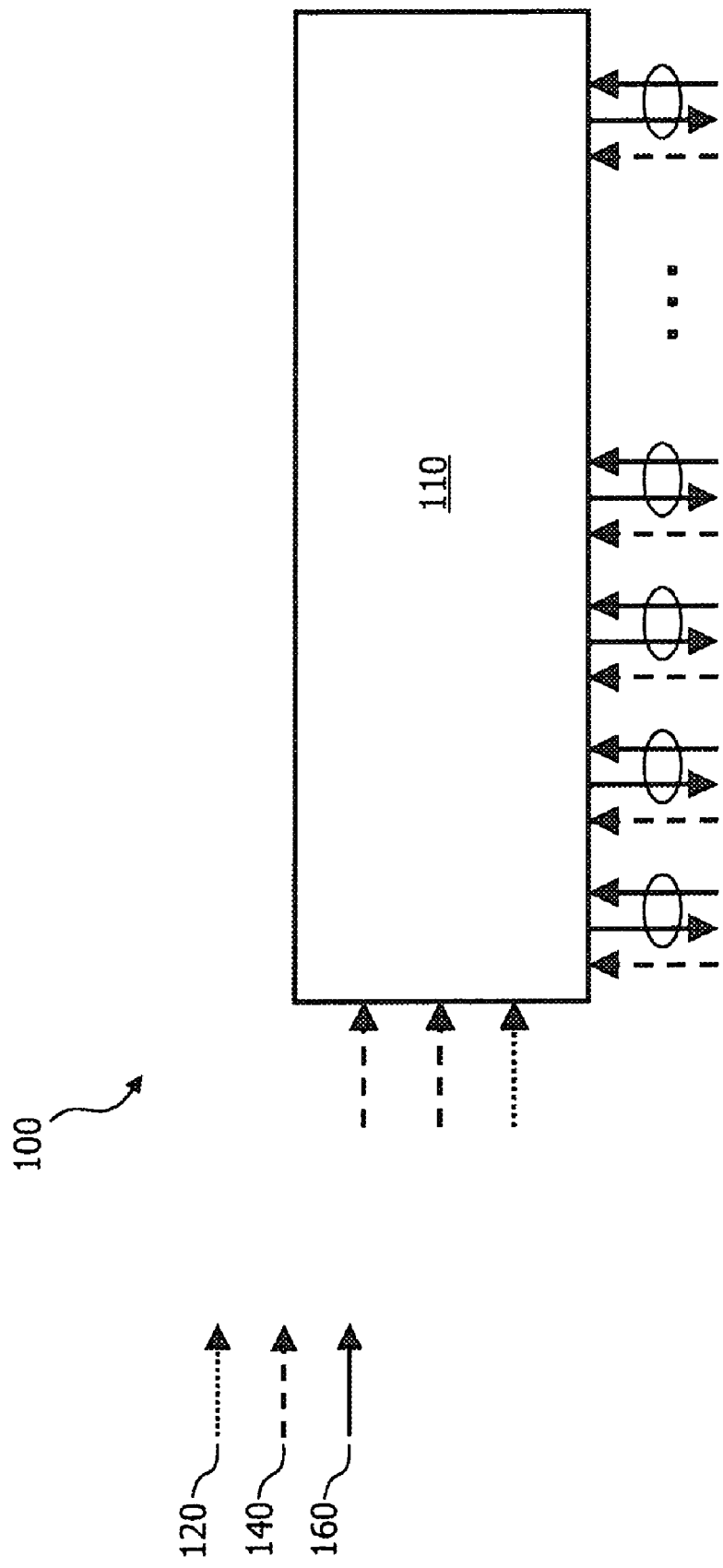
FIG. 1 shows a general block diagram of a memory architecture according to the invention.

FIG. 1 shows a general block diagram of a memory architecture according to the invention. The memory architecture 100 includes a body 110, a control input 120, a plurality of address inputs 140 and a plurality of read and a plurality of write ports 160. The body 110 includes a plurality of memories. The memory architecture 100 supports all possible modes of a memory access; these modes include a single address access mode, a scatter/gather access mode, a move operation mode amongst the plurality of memories within the architecture 100 etc. The control input signal 120 selects the mode of operation of the memory architecture. The control input 120 may select one or more modes of operations.

Figure 2:
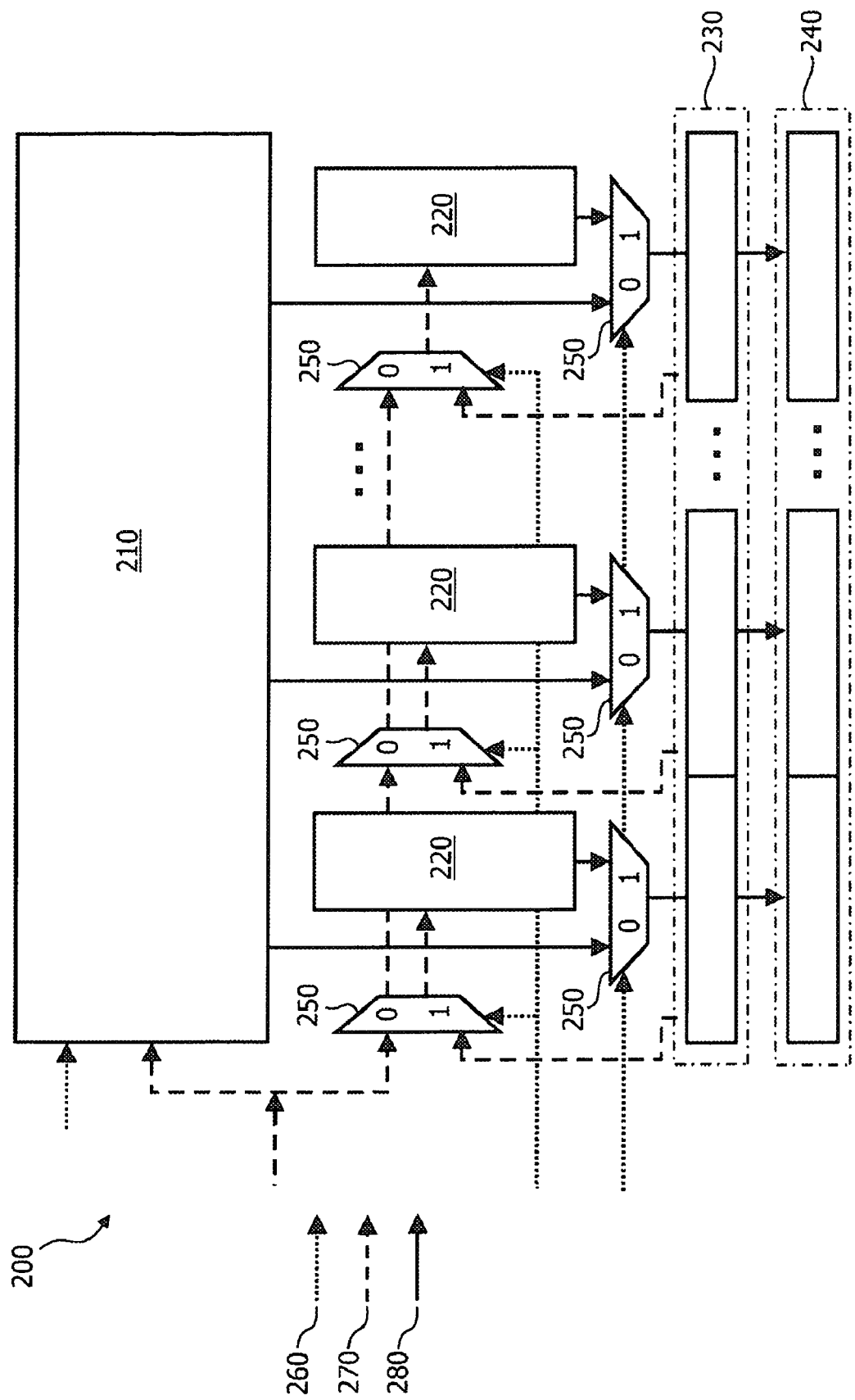
FIG. 2 shows a more detailed diagram of a memory architecture according to the invention.

FIG. 2 shows a more detailed diagram of a memory architecture 200 according to the invention. The memory architecture 200 is depicted in a data read mode. However, it is to be noted that figures may be drawn depicting other modes of operation of the memory architecture. The memory architecture 200 comprises a first memory 210, a second memory 220 and a communication facility 250. The first memory 210 corresponds to the basic SIMD device having at least one bank, and said first memory 210 is addressable by a single address. The second memory 220 corresponds to the advanced SIMD device having a plurality of memory banks. The second memory 220 is addressable by an address vector supplied by an address supplying means 230. Each bank of the second memory 220 is addressable by a component of the address vector. The width of a memory bank in the second memory 220 is at most half of the width of a memory bank in the first memory 210. The first memory 210 and second memory 220 are coupled selectively through the communication facility 250. The communication facility 250 shown includes multiplexors, however other devices equivalent to multiplexors (e.g. tri-transistors etc) may be used for selectively coupling said first memory 210 and second memory 220. The second memory 220 receives the address vector from the address supplying means 230. The address supplying means 230 can be implemented by using latches or by using registers or by using SRAMs. In the read or write operation from the memory architecture 200 the data may be received in data communicating means 240. The data communication means 240 may be implemented in using latches, registers or SRAM. The first memory 210, the second memory 220 and the communication facility 250 receive a control input signal 260 that is indicative of a desired mode of operation of the memory architecture 200. The control input signal 260 accordingly, enables the communication facility 250 to select connections amongst on-chip/board resources and enables the first or second memory 210, 220 or both to select one amongst a read and a write mode. In the Figure lines identified by 260 represent the control inputs, lines identified by 270 represent the address path and lines identified by 280 represent the data path.

According to one example the first memory 210 may have 4 banks each having a vector of 4K entries of 4 word wide and the second memory 220 may have 32 banks each having a vector of 64 entries of 1 word wide. The width of a word may be, for example 16 or 32 bits. The second memory may be implemented in latches or in SRAM or in registers.

The memory architecture 200 enables inclusion of an advanced SIMD device and a basic SIMD device and inclusion communication facility for communicating amongst them. The advanced SIMD device is implemented in a small portion as compared to the basic SIMD device, thereby reducing the silicon area overhead, the power consumption and the production cost without compromising the functionalities/flexibilities/advantages of the advanced SIMD devices. The communication facility ensures that the data present in basic SIMD device portion is also available to the advanced SIMD device when desired by the advanced SIMD device and vice versa. This allows the memory architecture to support scatter/gather operation in spite of the fact that entire memory is not implemented in advanced SIMD device.

Figure 3:
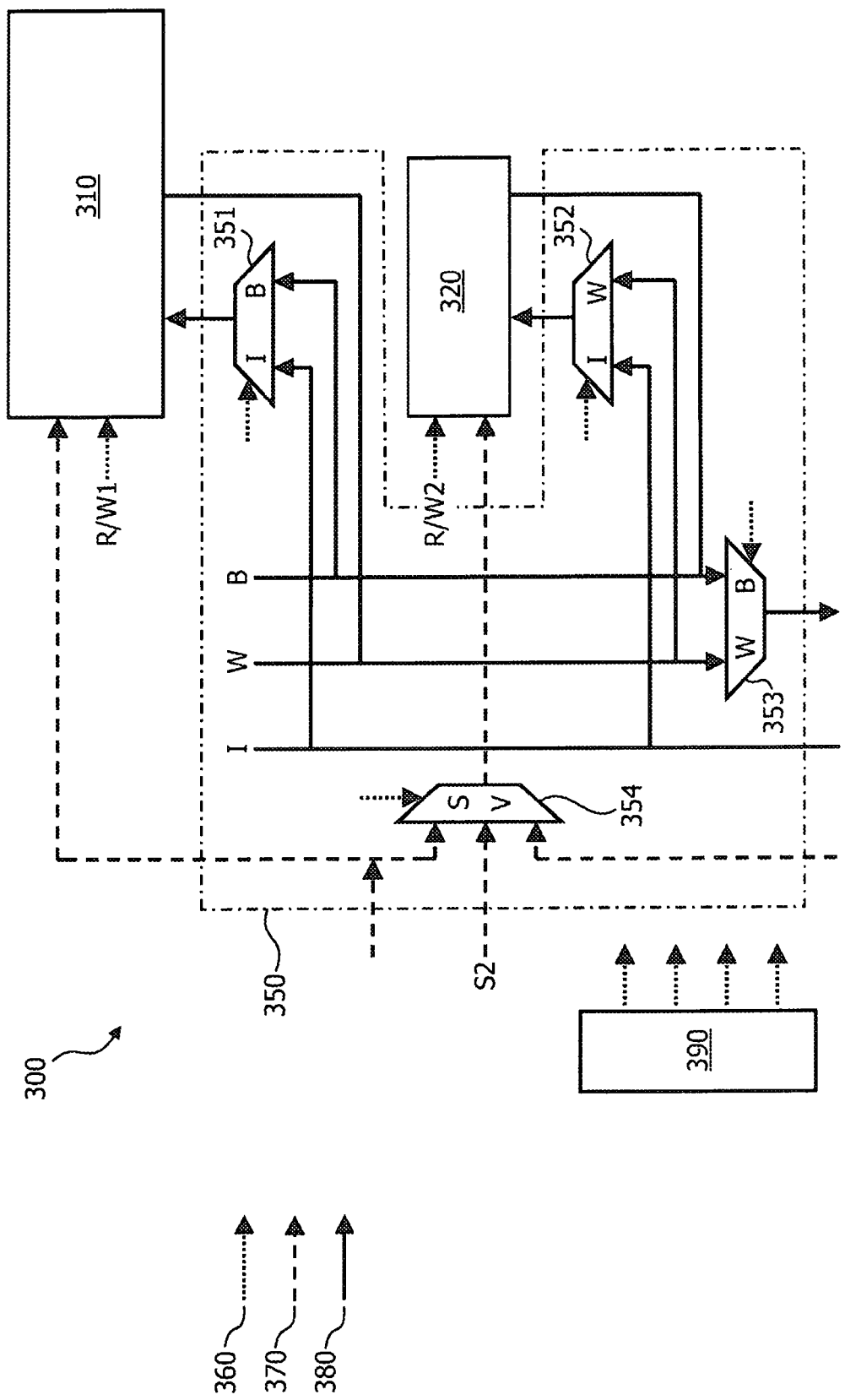
FIG. 3 shows a further more detailed diagram of a memory architecture according to the invention.

FIG. 3 shows a further detailed diagram of a memory architecture 300 according to the invention. In the Figure lines identified by 360 represent control inputs, lines identified by 370 represent address path and lines identified by 380 represent data paths. The memory architecture 300 shows a first memory 310 and a second memory 320 according to invention. It is to be noted that the second memory 320 has plurality of banks, however only one bank is shown for the sake of simplicity of explanation. A role of a communication facility 350 will be explained using FIG. 3. The communication facility 350 is used for communicating data in/out of the memory architecture 300 and from/to the first memory 310 and the second memory 320. The communication facility 350 comprises multiplexors 351, 352, 353 and 354 and lines I, W and B. The multiplexor 351 receives inputs from lines B and I, and provides its output to the first memory 310. The multiplexor 352 receives inputs from lines W and I, and provides its output to the second memory 320. The multiplexor 353 receives its inputs from lines W and B, and provides it to the output of the memory architecture 300. The multiplexor 354 receives the addresses (S, V) by which the first memory 310 and second memory 320 are addressed. The multiplexor 354 may further receive an additional input (S2) to enable the movement of the data from one memory to the other memory within the architecture 300. Each of the multiplexor 351, 352, 353 and 354 receive their control signals from a controller 390. The first memory 310 and second memory 320 receive a single and a vector address respectively. The controller 390 provides control signals R/W1 to the first memory 310 and R/W2 to the second memory 320. The first memory 310 is further connected to line W. The second memory 320 is further connected to line B.

The memory architecture 300 can be used for a move operation by supplying a single address at S and/or S2 indicating a first data locations and a component of address vector to the second memory indicating a second data location or a plurality of second data locations. The addresses are supplied through the address paths 380. The first memory 310 and the second memory 320 receive signals R/W1 and R/W2 indicative of a desired direction of movement of data from the controller 390. A path from the first memory 310 to the second memory 320 through the multiplexor 352 or a path from the second memory 320 to the first memory 310 through the multiplexor 351 is selected according to the desired direction of the movement of data. For executing a write operation, the memory architecture 300 is supplied with an address of the location where the data is to be written. The architecture 300 is also supplied with the data at the line I. One of the multiplexors 351 or 352 is enabled to connect line I depending on the addressed location to write the data in the memory architecture 300. For executing a read operation an address from where the data is to be read is supplied through the multiplexor 354 to the memory that has stored the data. The memory that stores the data, that is to be read, is enabled for read operation. One of the inputs of the multiplexor 353 is selected depending on the addressed location to provide the data at the output of the memory architecture 300.

The table in FIG. 3a shows different modes of operation possible with the memory architecture 300. The left half of the table shows possible operations. The first column shows the instructions (opcode) required for execution of an operation. The second and the third column respectively show the source and the destination of the data. The possible source and destination are the first memory 310, the second memory 320, the output of the memory architecture 300 and the input of the memory architecture 300. The right half of the table shows the state of the multiplexor control inputs, the R/W control inputs of the memories 310, 320 and the mode of addressing. Operations that are explained in the table include: read operation, in which a data stored in the memory is supplied at the output of the memory architecture 300; write operation, in which a data from the output of the architecture 300 is stored in the memory, and; move operation, in which a data from one memory is moved (stored) to other the memory. Further entries of the table show a Gather-read operation, a Scatter-write operation and Scatter and Gather move operations. The operations in Scatter/Gather mode enable writing/reading of data to/from a plurality of memory locations in a single clock cycle.

Entry 1 of the table is explained in subsequent discussion. The explanation of entries 2 to 10 is analogous thereof. Entry 1 explains a read operation. The data is to be read from the first memory 310 (Source) and to be supplied at the output of the memory architecture 300 (Destination). For executing this operation the addressing mode is a single addressing mode (√). The multiplexor 354 selects single address (S). The single address S is supplied to the first memory 310. The control input R/W1 enables the first memory in a read-mode (R). The multiplexor 353 selects line W to supply data from the first memory 310 to the destination i.e. at the output of the memory architecture 300.

Figure 4:
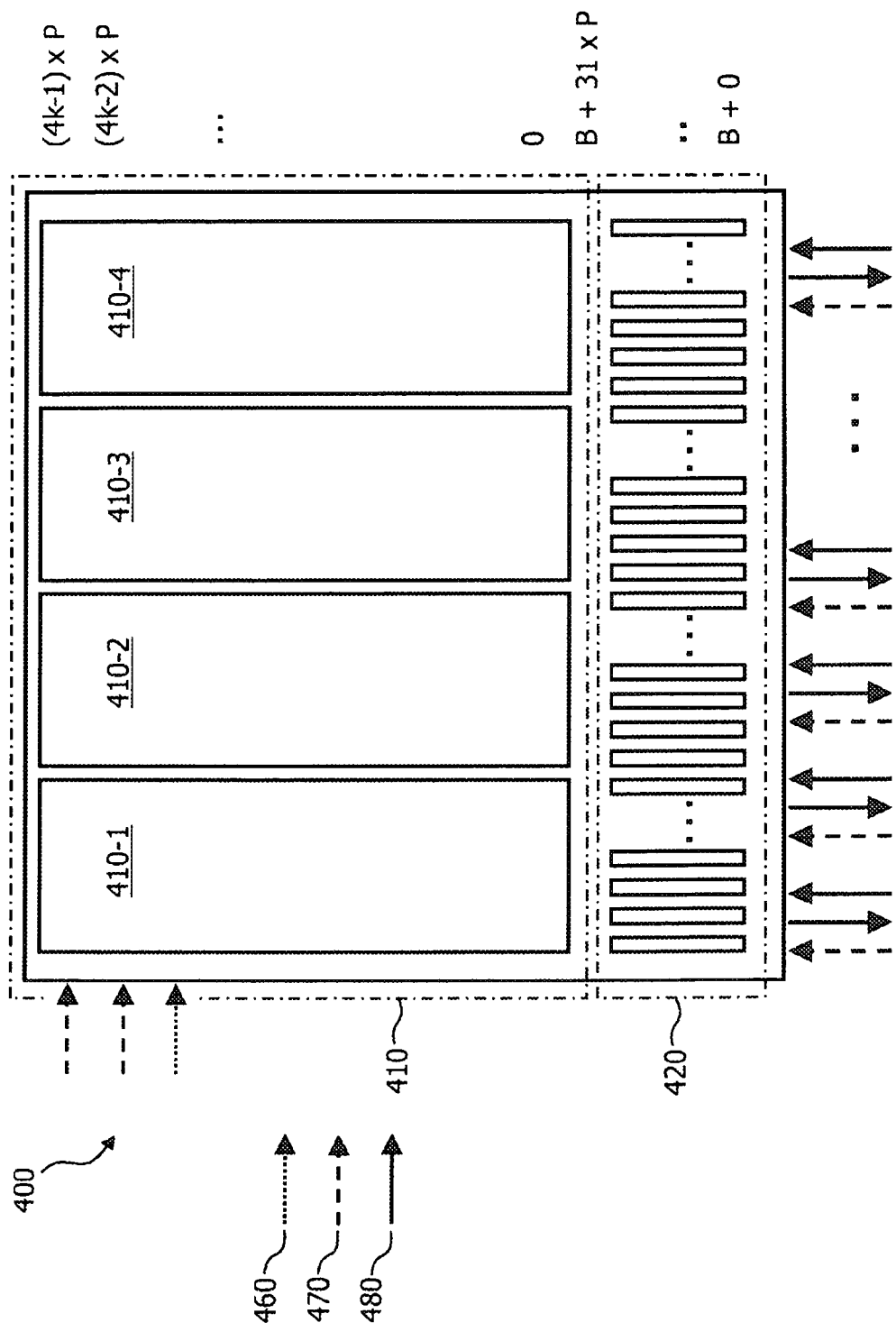
FIG. 4 shows a layout diagram of a memory architecture according to an embodiment of the invention.

FIG. 4 shows a layout diagram of a memory architecture 400. The memory architecture 400 has a first memory 410 having memory banks 410-1, 410-2, 410-3 and 410-4 and a second memory 420. In the Figure lines identified by 460 represent control inputs, lines identified by 470 represent address path and lines identified by 480 represent the data path. The Figure depicts the memory architecture having a first and a second memory 410, 420 with mutually non-overlapping address space. In this example it is assumed that the first memory 410 has 4K vectors whereas the second memory has 32 vectors. The first memory 410 has four banks having a total width of P words. The second memory 420 has for example, 32 banks and also having a total width of P words. The non-overlapping address space varies from B+0 to B+32×P addressing the second memory 420 and from 0 to (4K−1)×P addressing the first memory 410.

Figure 5:
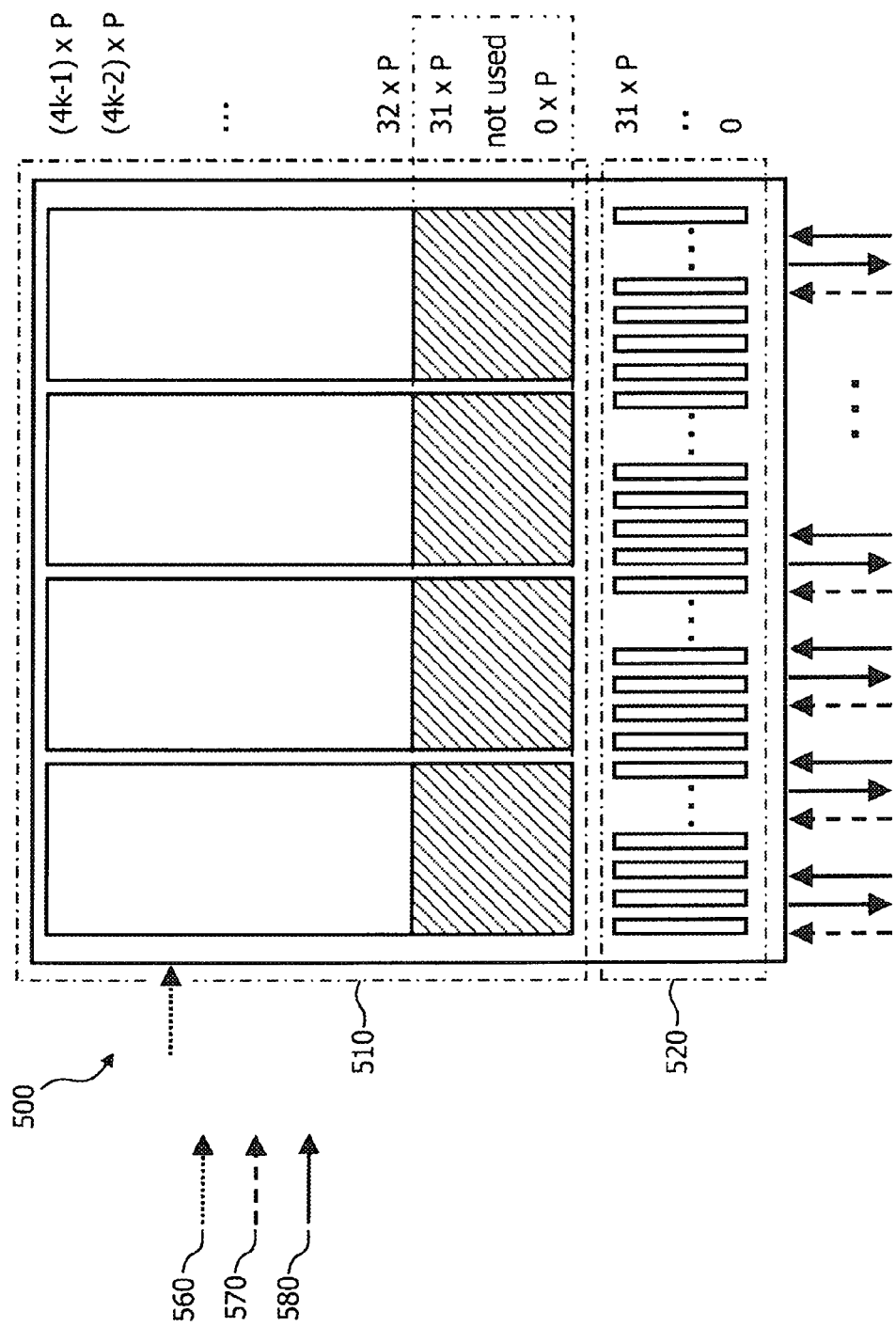
FIG. 5 shows another layout diagram of a memory architecture according to another embodiment of the invention.

FIG. 5 shows another layout diagram of a memory architecture 500. The memory architecture 500 depicts a first and a second memory 510 and 520 having an overlapping address space. In this example it is assumed that the first memory 510 has 4K vectors of P words whereas the second memory has 32 vectors of P words. The memory architecture 500 is addressed by an overlapping address space. The overlapping address space varies from 0 to (4K−1)×P. The addresses 0 to 31×P are common in both the first memory 510 and the second memory 520. In the first memory 510 the locations addressed by the addresses that are common in both the first memory and the second memory are not used. In the Figure lines identified by 560 represent control inputs, lines identified by 570 represent address path and lines identified by 580 represent the data path.

The memory architectures explained shown in FIG. 1 to 5 include the facilities of the advanced SIMD devices. However a substantially large part of the memory is implemented according to the basic SIMD. Hence these architectures offer many advantages over the prior art. The advantages include: the architecture is cheaper; it is silicon area efficient architecture, and; it is a power efficient architecture.

The memory architecture is further advantageous over the prior art of Bedros et at. [1] as it does not affect the register file and bypass/forward network; it allows VLIW parallelism around register-file; it allows the register file to be used for other purposes, e.g. when the second memory is being used for table-look up, or for matrix storage, and; it requires only two clock cycles to transpose a matrix when the incoming data is directly written in the second memory and similar benefits are offered for block (de-) interleaving. The memory architecture is furthermore advantageous, as it does not require introduction of a dedicated function unit into VLIW architecture for addressing the register bypassing/forwarding and the requirement of repeatedly loading LUT. This avoids transportation cycles from/to functional unit, hardware duplication (e.g. for rotate/shuffle operation), and the requirement of instruction bits for the operations on the functional unit.

Above advantages will further be apparent from the following example of matrix transposition. A P by P matrix according to Bedros et al. [1] may be now be implemented in following steps:

1. move P vectors of P words of 16 bit from the first memory to the second memory;
2. load a pair of mutually opposite warped diagonals into a first and second registers, a warped diagonal of a matrix M (i, j) is defined here as a set of elements M (i,(i+k) mod P);
3. rotate elements of the first and the second register until the elements originating from the first row of the matrix is in a first location of the register;
4. store the rotated diagonals into the second memory to obtained a transposed warped diagonal, and;
5. repeat the steps 2, 3 and 4 for subsequent pairs of warped diagonals until matrix transposition is complete.

The transposed matrix may be stored in the first or the second memory. Sufficient parallelism between load/store and rotate/shuffle operations can be achieved by pipelining. A proper-pipelined operation will require only two clock cycles per vector transposition.

Figure 6:
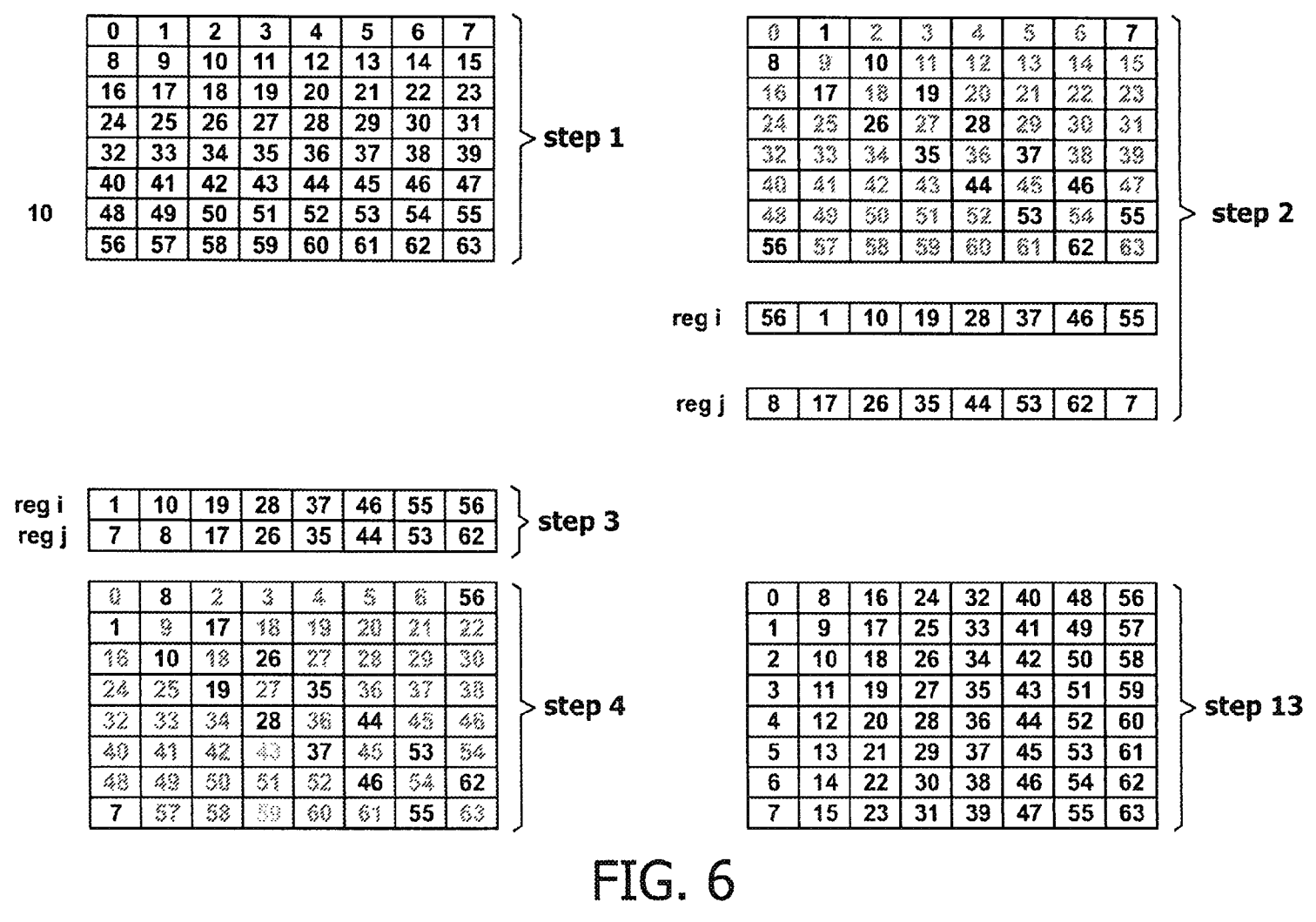

FIG. 6 depicts an explicit example of matrix transposition using an 8 by 8 matrix. In the first step (step 1) 8 vectors of 8 words are moved from the first memory to the second memory. The matrix may also be received in the second memory from the input of the memory architecture. In the second step (step 2) a pair of mutually opposite warped diagonals is loaded into a first and a second register (reg i, reg j). In the third step (step 3) the elements the first and second registers (reg i, and reg j) are rotated until the element originating from the first row of the matrix is in a first location of the registers. In the step (step 4) the rotated diagonals are stored to achieve an intermediate matrix shown in the Figure. Repeating above steps for each diagonal (four diagonals) produces the final transposed matrix in step 13 for this example, as shown in the Figure.

Figures 7A, 7B, 7C, 7D:
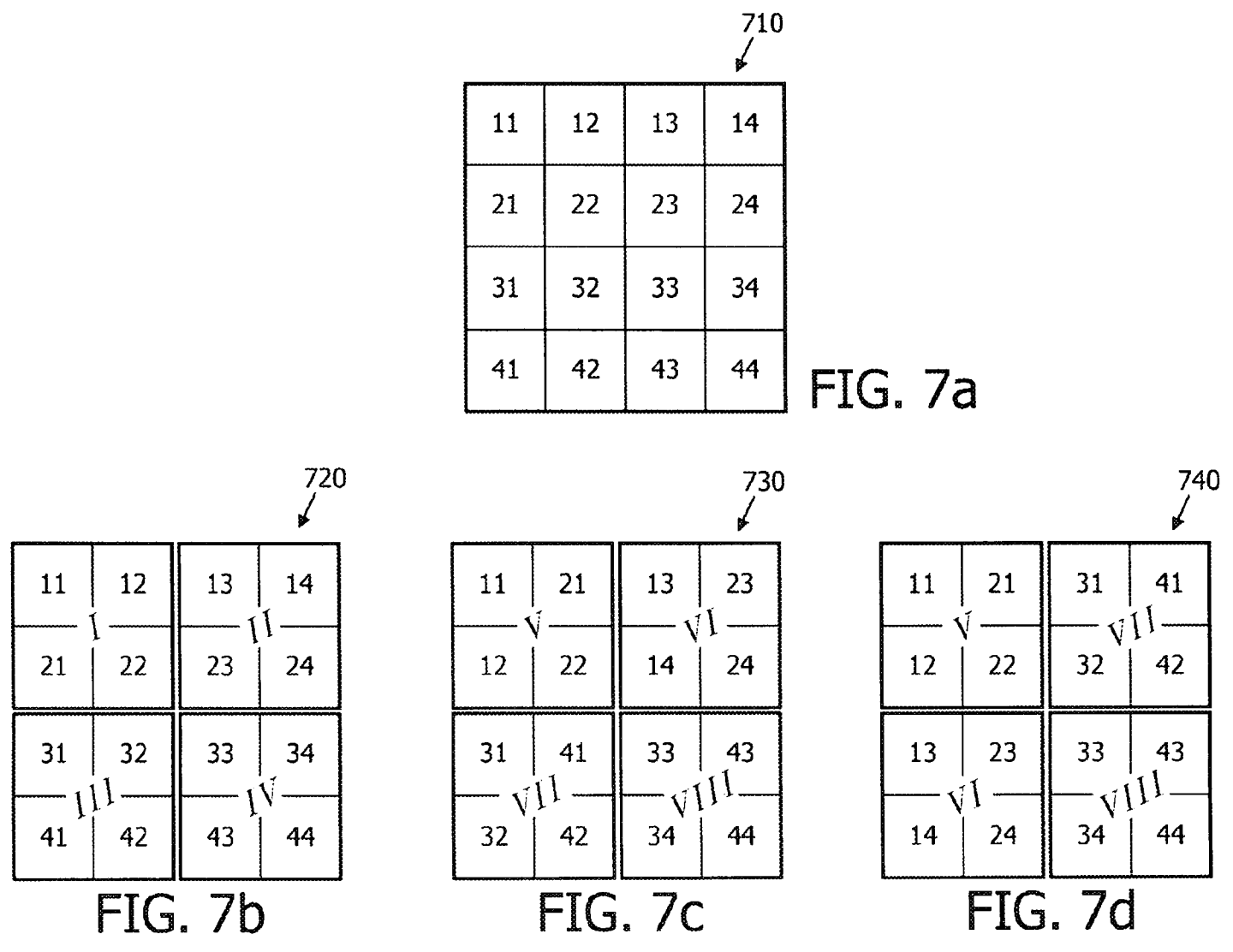

FIGS. 7a-7d illustrate another matrix transposition using the memory architecture according to the invention. The Figures depict situation when the second memory is too small to handle a matrix 710 at once. That is the matrix 710 is larger then a largest matrix that can be handled by second memory in a given situation. By way of example, it is assumed that each bank of the second memory can accommodate only two elements. Then, in such cases the matrix 710 is stored in the first memory. The matrix is divided in a plurality of second matrices I, II, III and IV 720 as shown in FIG. 7b. The elements of one or more second matrices are moved to the second memory from the first memory. Each of the second matrices I, II, III and IV are individually handled by the second memory to produce a set of transposed second matrices V, VI, VII and VIII 730 as shown in FIG. 7c. The second matrices may be handled individually according to the method discussed with reference to FIG. 6. A transposed matrix 740 is achieved by rearranging the transposed second matrices VI and VII as shown in FIG. 7d. This feature of the invention is advantageous, in particular, for a video/image frame transposition. Video/Image frame comprises a plurality of blocks and each block comprises a plurality of matrices. The method of the invention offers a time and resource efficient solution for computing a matrix transposition for video/image frames by allowing a matrix-by-matrix and a block-by-block transposition.

The order in the described embodiments of the methods and systems of the current invention is not mandatory, and is illustrative only. The scope of the invention is not limited to the described embodiments. A person skilled in the art may change the order of steps or perform steps concurrently using threading models, multi-processor systems or multiple processes without departing from the concept as intended by the current invention. Any such embodiment will fall under the scope of the invention and is a subject matter of protection.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the system claims enumerating several means, several of these means can be embodied by one and the same item of computer readable software or hardware. The mere fact that certain measures are recited in mutually different dependent claims does not indicate that a combination of these measures cannot be used to advantage.

REFERENCES

[1] Bedros Hanounik and Xiaobo (Sharon) Hu, "*Linear-time Matrix Transpose Algorithms Using Vector Register file With Diagonal Registers*", published in Parallel and Distributed Processing Symposium, Proceedings 15th International, 23-27 Apr. 2001 Page(s):8 pp. 2001.

The invention claimed is:

1. A memory architecture comprising:
   a first memory having at least one bank with a first width addressable by a single address;
   a second memory having a plurality of banks of a second width, said banks being addressable by components of an address vector and said second width being at most half of the first width, said first and second memories being coupled selectively, and
   wherein said first and second memories are coupled selectively by a communication facility comprising a plurality of multiplexors, said communication facility enabling read/write operations and enabling the architecture to move data between the first memory and the second memory.

2. The memory architecture according to claim 1 wherein the size of the addressable range of locations in the second memory is smaller than the size of the addressable range of locations in the first memory.

3. The memory architecture according to claim 1 wherein said second memory is implemented by latches.

4. The memory architecture according to claim 1 wherein said first and second memory are provided with a shared read and write facility.

5. The memory architecture according to claim 1 wherein said first memory and said second memory have mutually non-overlapping address spaces.

6. The memory architecture according to claim 1 wherein said first memory and said second memory have an overlapping address space.

7. A memory architecture comprising:
   a first memory having at least one bank with a first width addressable by a single address;
   a second memory having at least two banks of a second width, said banks being addressable by components of an address vector and said second width being at most half of the first width;
   a communication facility configured to selectively couple the first and second memories, and enable read/write operations and moving data between the first memory and the second memory; and
   a controller operable for generating a first read/write control signal for the first memory, a second read/write signal for the second memory and at least one control signal for controlling the communication facility.

8. The memory architecture according to claim 7 wherein the size of the addressable range of locations in the second memory is smaller than the size of the addressable range of locations in the first memory.

9. The memory architecture according to claim 7 wherein said second memory is implemented by latches.

10. The memory architecture according to claim 7 wherein said first and second memory are provided with a shared read and write facility.

11. The memory architecture according to claim 1 wherein said first memory and said second memory have mutually non-overlapping address spaces.

12. The memory architecture according to claim 1 wherein said first memory and said second memory have an overlapping address space.

13. A memory architecture comprising:
   a first memory having a plurality of banks, each bank having a first width, with the first memory addressable by a single address;
   a second memory having a plurality of banks of a second width, said banks being addressable by components of an address vector and said second width being at most half of the first width;
   a communication facility comprising a plurality of multiplexors, the communication facility configured to enable read/write operations and moving data between the first memory and the second memory; and
   a controller operable for generating a first read/write control signal for the first memory, a second read/write signal for the second memory and at least one control signal for controlling the plurality of multiplexors.

14. The memory architecture according to claim 13 wherein the size of the addressable range of locations in the second memory is smaller than the size of the addressable range of locations in the first memory.

15. The memory architecture according to claim 13 wherein said second memory is implemented by latches.

* * * * *